US010791133B2

(12) United States Patent
Shukla et al.

(10) Patent No.: US 10,791,133 B2
(45) Date of Patent: Sep. 29, 2020

(54) SYSTEM AND METHOD FOR DETECTING AND MITIGATING RANSOMWARE THREATS

(71) Applicant: Tata Consultancy Services Limited, Mumbai (IN)

(72) Inventors: Manish Shukla, Pune (IN); Sutapa Mondal, Pune (IN); Sachin Premsukh Lodha, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 494 days.

(21) Appl. No.: 15/791,202

(22) Filed: Oct. 23, 2017

(65) Prior Publication Data

US 2018/0115577 A1 Apr. 26, 2018

(30) Foreign Application Priority Data

Oct. 21, 2016 (IN) .............................. 201621036148

(51) Int. Cl.
| H04L 29/06 | (2006.01) |
| G06F 21/62 | (2013.01) |
| G06F 21/56 | (2013.01) |
| G06F 21/55 | (2013.01) |

(52) U.S. Cl.
CPC .......... H04L 63/1425 (2013.01); G06F 21/55 (2013.01); G06F 21/562 (2013.01); G06F 21/6218 (2013.01); H04L 63/1416 (2013.01)

(58) Field of Classification Search
CPC ............. H04L 63/1425; H04L 63/1416; G06F 21/6218
See application file for complete search history.

(56) References Cited

U.S. PATENT DOCUMENTS

| 9,514,309 | B1 | 12/2016 | Mann | |
| 2011/0219451 | A1* | 9/2011 | McDougal | .......... H04L 63/1416 726/23 |
| 2017/0366563 | A1* | 12/2017 | Volfman | ............. H04L 63/1491 |
| 2018/0060579 | A1* | 3/2018 | Stepan | .................... G06F 21/53 |

FOREIGN PATENT DOCUMENTS

EP 2750066 A2 12/2014

* cited by examiner

Primary Examiner — Harunur Rashid
(74) Attorney, Agent, or Firm — Finnegan, Henderson, Farabow, Garrett & Dunner LLP

(57) ABSTRACT

This disclosure relates generally to malware detection, and more particularly to system and method for detecting and mitigating ransomware threats. For a User Equipment being monitored, the system performs a behavior analysis of corresponding file system to determine whether any anomalous behavior that would amount to a ransomware threat is associated with flies associated with the file system change, if present, then the system virtualizes the file system on the fly. If information pertaining to the identified anomalous behavior is present in any of the reference databases in the system, then all the I/O calls are terminated or the file system is virtualized for rest of the session. If data pertaining to the identified anomalous behavior is not found in any of the associated databases, then new behavioral features and structural patterns of the identified anomalous behavior and the associated processes are extracted, and the reference databases are updated accordingly.

10 Claims, 6 Drawing Sheets

SYSTEM AND METHOD FOR DETECTING AND MITIGATING RANSOMWARE THREATS

PRIORITY CLAIM

This U.S. patent application claims priority under 35 U.S.C. § 119 to: India Application No. 201621036148, filed on Oct. 21, 2016. The entire contents of the aforementioned application are incorporated herein by reference.

TECHNICAL FIELD

This disclosure relates generally to malware detection, and more particularly to detect and mitigate ransomware threats.

BACKGROUND

Ransomware is a malware that functions by encrypting flies on a user system and demands money for giving back file access to user. Depending on complexity of the ransomware, flies and/or drives of the system can get encrypted. This results in huge financial losses. The ransomware attack can further cause loss of data, loss of reputation, data security issues, and so on. Apart from that the ransomware might also install a backdoor for future exploitation.

Systems are available for detection and mitigation of common malware threats. However, ransomware threats are generally difficult to trace owing to indistinguishibility of ransomware processes from any normal process. Ransomware can be a single application, or could have been injected into a trusted process, or may be spread across multiple processes. This flexibility in terms of deployment makes it difficult to identify the process/application that acts as the ransomware.

The inventors here have recognized several technical problems with such conventional systems, as explained below. Some of the existing solutions being used for ransomware detection are signature based pattern detection, static code analysis of binaries, and runtime analysis of process behavior. However, owing to the flexibility that allows the ransomware to be used in different ways, the aforementioned methods fail to detect new variants of ransomware. For example, the signature based detection and the binary analysis can fail if the ransomware is spread across various phases or the attack is delegated to multiple processes or the ransomware is external to the execution environment like a Java Runtime Environment executing a ransomware written in Java or equivalent programming language.

SUMMARY

Embodiments of the present disclosure present technological improvements as solutions to one or more of the above-mentioned technical problems recognized by the inventors in conventional systems. For example, in one embodiment, a processor-implemented method is provided. In this method, file system of a User Equipment (UE) being monitored for ransomware attack is monitored for any file system event pertaining to execution of an Input/Output (I/O) call, via one or more hardware processors, by a threat management system. If a file system event is detected, then a behavioral analysis of one or more files in the file system, associated with a detected file system event is performed to identify whether there is any anomalous behavior that would amount to a ransomware threat, via one or more hardware processors, by the threat management system. If results of the behavioral analysis indicates any anomalous behavior, then vsrtualization of the file system is done, wherein the file system is virtualized for all processes operating on the one or more files, during the virtualization, via the one or more hardware processors, by the threat management system. Further, one or more reference databases in the threat management system is checked to find a match for the identified anomalous behavior, via the one or more hardware processors, by the threat management system. If a match is found, then either all processes are terminated or all I/O calls for the process identified as exhibiting the malicious behavior are visualized for rest of the session via the one or more hardware processors, by the threat management system. If no match is found in any of the reference databases, then behavioral features and structural patterns of the flies showing anomalous behavior, and the processes causing those anomalous behavior, are extracted by performing behavioral and structural analysis respectively, and the extracted data are sent to a server associated with the threat management system, to update a global database maintained by the server.

In another embodiment, a threat management system is provided. Monitor file system of a User Equipment (UE) being monitored for ransomware attack for any file system event pertaining to execution of an Input/Output (I/O) call, via one or more hardware processors, by a local agent of the threat management system. If a file system event is detected, then a behavioral analysis of one or more files in the file system, associated with a detected file system event is performed by the local agent to identify whether there is any anomalous behavior that would amount to a ransomware threat. If results of the behavioral analysis indicates any anomalous behavior, then visualization of the file system is done by the local agent, wherein the file system is virtualized for all processes operating on the one or more flies, during the virtualization. Further, one or more reference databases in the threat management system are checked to find a match for the identified anomalous behavior, by the local agent. If a match is found, then either all processes are terminated or all I/O calls for the process identified as exhibiting the malicious behavior are virtualized for rest of the session via the one or more hardware processors, by the local agent. If no match is found in any of the reference databases, then behavioral features and structural patterns of the files shewing anomalous behavior, and the processes causing those anomalous behavior, are extracted by performing behavioral and structural analysis respectively, and the extracted data are sent to a server associated with the threat management system, to update a global database maintained by the server, by the local agent.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings, in the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
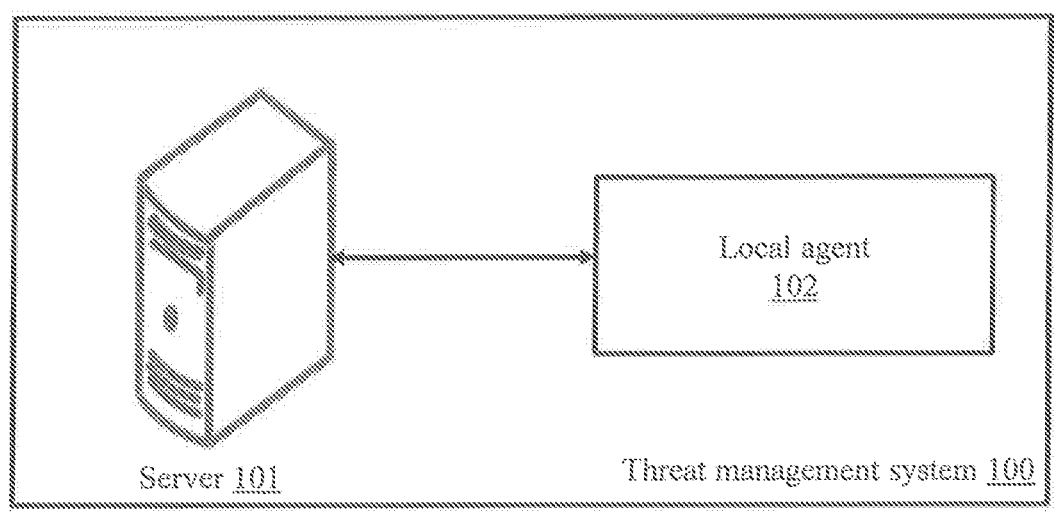
FIG. 1 illustrates an exemplary block diagram of a threat management system that performs detection and mitigation of ransomware, according to some embodiments of the present disclosure.

FIG. 1 illustrates an exemplary block diagram of a threat management system that performs detection and mitigation of ransomware, according to some embodiments of the present disclosure.

The threat management system 100 includes a server 101 and at least one local agent 102. The threat management system 100 can be configured to monitor and detect ransomware threats with one or more associated User Equipment (UE). It is to be noted that the number of components of the threat management system 100, mode of implementation, and other implementation specific features as in FIG. 1 are for illustration purpose only, and can vary as per implementation standards and requirements. Further, though the present disclosure is explained considering that the ransomware detection and mitigation are being performed by the local agent 102, in a different implementation, one or more processes associated with the detection and mitigation of the ransomware can be performed by the server 101.

The local agent 102 can be a dedicated element that is in communication with the server 101 and at least one UE that is being monitored for malware attacks by the threat management system 100. In an embodiment, the local agent 102 is outside the UE that is being monitored for malware threats, and communicates with the UE through an appropriate communication channel established. In another embodiment, the local agent 102 is deployed inside the UE being monitored for ransomware attack/threat, with appropriate access rights to file system of the UE, and with appropriate communication rights with one or more components of the UE if needed. The local agent 102 can be configured to perform at least one process with respect to detection and mitigation of ransomware attack. The local agent 102 can be configured to detect an attack or a possible threat based on specific reference data, and at least one criteria that specifies a condition that indicates an attack or a possible threat. In an embodiment, the reference data includes one or more behavioral traits. The local agent 102 can be configured to perform at least one of a behavioral analysis and structural analysis to detect the threat.

The process being followed by the local agent 102 for detecting the threat is explained below:

The local agent 102 monitors for any file system filter driver hierarchy change on the UE. In case of a hierarchy change event the local agent checks for authenticity of the installed component, and, notifies and log the event and authenticity check result on the server component. Based on the result a system administrator can decide whether the change is legitimate or malicious. For any I/O call received and processed by the UE, the local agent 102 identifies associated files in the file system (i.e. the files that have been altered/processed/modified for the I/O call). In another embodiment, only those process/processes and their associated files on the file system which causes file system anomaly or exhibit an abnormal behavior (in terms of traits and features defined) are analyzed. For example, file deletions/conversions being high entropy operations trigger suspicion, and, the process/processes responsible for causing that change to those files are analyzed for threat detection and mitigation. Now, if there is a ransomware threat, processes accessing and modifying the files can be malicious, hence can corrupt or encrypt the files, leading to file loss. To identify any such threat, the local agent runs a behavioral analysis on the files for which I/O calls/events are generated. This event based analysis helps in time, disk and resource efficient analysis of the possible threat. In this process, the local agent 102 extracts a plurality of features of the files, and compares the extracted features with a threat feature database in which features associated with certain (malicious/suspicious) behavioral traits are listed. By doing the comparison, the local agent 102 checks for one or more matches for the features extracted from the files, in the threat feature database. A threshold value in terms of number of matches between the extracted features and features in the threat feature database is defined and stored in one or more references databases associated with the threat management system 100. In an embodiment, the term 'reference database' collectively refers to threat feature database, reference database of patterns and any other database associated with any component of the threat management system 100. In an embodiment, the features of the behavioral traits listed in the threat reference database are categorized based on what each trait is related to, as shown in the tables given below:

TABLE 1

| Features | Comments |
|---|---|
| Shannon Entropy | $E_\Delta = E_{Write} - E_{Read}$ |
| Mime | Change of mime type |
| Similarity Change | Fuzzy Hash $(_{orig,\,final})$ |
| Rate of deletion | Secondary Indicatior |
| IRP Sequence | Order of events |

TABLE 2

| Features | Strain 1 | Strain 2 | Strain 3 |
|---|---|---|---|
| File attributes (C1) |  | ✓ | ✓ |
| Path Diversity (C2) | ✓✓ | ✓ | ✓✓ |
| Process Hierarchy (C2) | ✓ | ✓✓ |  |
| Bytes Read (C2) | ✓✓ | ✓ | ✓✓ |
| Bytes Written (C2) | ✓✓ | ✓ | ✓✓ |
| File Handles (C2) | ✓✓ | ✓ | ✓✓ |
| Entropy Density (C3) | ✓✓ | ✓ | ✓ |

TABLE 2-continued

| Features | Strain 1 | Strain 2 | Strain 3 |
| --- | --- | --- | --- |
| Rate of Creation (C3) | | ✓✓ | ✓ |
| Rate of Modification (C3) | ✓✓ | ✓ | |
| Rate of size change (C3) | ✓✓ | | |
| Rate of mime change (C3) | | | ✓✓ |

Here, Category 1 (C1) relates to features directly related to files (subject), Category 2 (C2) are features directly related to a process (actor), and Category 3 (C3) consists of features related to impact (action). Upon comparing extracted features of files, with the reference tables, if a particular number (i.e. equal to or greater than the threshold value) of matches are found, then the file is identified as under possible attack from a ransomware threat. Once a candidate (i.e. a file facing the ransomware threat) is detected, then the local agent 102 identifies all processes accessing the file as part of the latest I/O call that has been processed, and virtualizes the I/O call and in effect the file system for all the identified processes. The visualization step helps in multiple ways for example in one instance it helps the local agent 102 in avoiding any kind of damage or loss to the user files. In another example the file system virtualization allows/helps the local agent in analyzing the attacking processes on a live user system.

After virtualizing the file system, the local agent 102 checks the associated databases for any match for the identified anomalous behavior. In an embodiment, the local agent checks own local database first and if no match is found, then checks a global database maintained by the server 101. If any match is found, then the local agent either terminates all processes associated with the identified anomalous behavior, else virtualizes all I/O calls associated with the process for rest of the session. Here, 'session' can refer to a specific time period for which the processes associated with the I/O calls continues to access/gain access to the files.

If no match is found in any of the reference databases, then the local agent 102 performs behavioral and structural analysis on the processes identified as the cause for file system anomaly or exhibiting anomalous behavior. In an embodiment, while multiple processes are associated with an I/O call, the ransomware threat/attack may be confined to one of the processes or may be distributed among more than one process. During the structural analysis, the local agent extracts one or more patterns or behavioral traits pertaining to the threat identified, from the processes, and compares the extracted pattern(s) or the behavioral traits with a reference database of patterns. The reference database of patterns may or may not be part of the threat feature database, and possesses information pertaining to patterns and other details of all threats that had been identified and mitigated in the past, by the threat management system 100. The reference database of patterns may also contain information pertaining to one or more actions taken to safeguard files from threats that had been identified in the past. This information can be used by the local agent 102 and/or the server 101 to determine appropriate counter actions if same/similar threats are identified at a later point of time. The reference database of patterns may also contain information pertaining to false suspicions (false positives) made in the past, and corresponding patterns, features and so on. So, if same/similar pattern is found in any file, the local agent 102 can revert virtualization if already done. All such data are stored in the global database maintained at the server 101 as well as at databases locally maintained at the local agent(s) 102.

Features listed in the aforementioned tables (Table 1 and Table 2) are used by the local agent 102 to differentiate between malicious and normal processes. Features such as but not limited to entropy density, path diversity are also considered for detection of malicious threats. Additionally, features such as but not limited to comparison of disk based binary image and loaded memory image, and comparison of static vs. runtime call graph mutation also are used for threat identification in case of mutated or infected 3rd party processes, for example the ransomware is injected into a trusted operating system process or any other trusted process. Finally, a cross validation is done based on C1 to reduce number of false positives. This categorization of features further helps in reducing the load on the system and reducing the false positives.

Further, for detecting attack which is divided into multiple processes, a parent-child and sibling graph is created. Further, by considering parameters such as but not limited to keeping count of handles, bytes read or written or deleted, and modification rate, the threat is detected.

The local agent 102 can be further configured to identify target files of the detected attack, and perform virtualization of the targeted file system to save the file system and associated files from the attack, and learn new features in a live attack when the ransomware is freewheeling. The local agent 102, by virtualizing the files, routes I/O calls that pose threat, to a sparse file created on the disk during the visualization or to an in-memory region for instance a Random Access Memory (RAM) disk. In an embodiment, if the sparse file is not available for read calls from the process that is identified as a threat, then the local agent 102 may allow read operation from the original file. However, write calls are always directed to the sparse file, as the sparse file can act as a quarantined zone that safeguards the original file. In case of a distributed network, the local agent 102 can be configured to use information pertaining to an identified attack to limit losses on one or more connected nodes.

The UE can be a laptop, desktop computer, a portable computer, a personal digital assistant, a handheld device, a Smartphone, a Tablet Computer, a workstation and the like. In various embodiments, the UE may or may not be part of a network. If the UE is part of a network, then the UE 102 can be configured to communicate with at least one other network entity (i.e. the server 101 or the local agent 102) using at least one suitable communication channel and at least one suitable communication protocol, to perform one or more actions pertaining to detection and mitigation of threats.

The server 101 can be configured to maintain in an associated memory space, at least one threat feature database as a reference database in which data related to features of behavioral traits of various file system are stored. As the threat management system 100 is a distributed network with at least one server 101 and multiple local agents (associated with corresponding UEs), the server 101 can be configured to gather/collect information pertaining to threat identification and mitigation from the associated local agents 102, and create and maintain a global database that comprises of information pertaining to threats identified, corresponding features and feature combinations, corresponding value of each feature, counter actions taken, false positives and so on. In short, the global database is a combination of threat feature database(s) and reference database of patterns. The global database is updated with information available from the local agents 102 in real-time, which helps the threat management system 100 in learning new features of the ransomware, which in turn helps the threat management system 100 to combat newer versions of the ransomware. Further, after each update or at periodic intervals, the server 101 broadcasts or unicasts (according to requirements) the updated database among all/specific local agents 102, so that database locally maintained by each local agent 102 always has the latest information. In another embodiment, the server 101 can be configured to allow the local agent 102 to refer to the global database as and when required. The server 101 can be further configured to support static as well as dynamic update of data in the threat feature database. The threat management system 100 further converts and projects file deletion activity as a high entropy process for handling a rogue process just focused on deleting files. The threat management system 100 is further capable of detecting an attack when the attack stages are delegated or divided into multiple processes or phases.

In an embodiment, the server 101 is configured to process data/information from any of the associated local agents 102, and accordingly instruct the local agent 102 to perform appropriate actions for the ransomware threat detection and mitigation. The local agent 102 may be configured to execute actions as instructed by the server 101.

Figure 2:
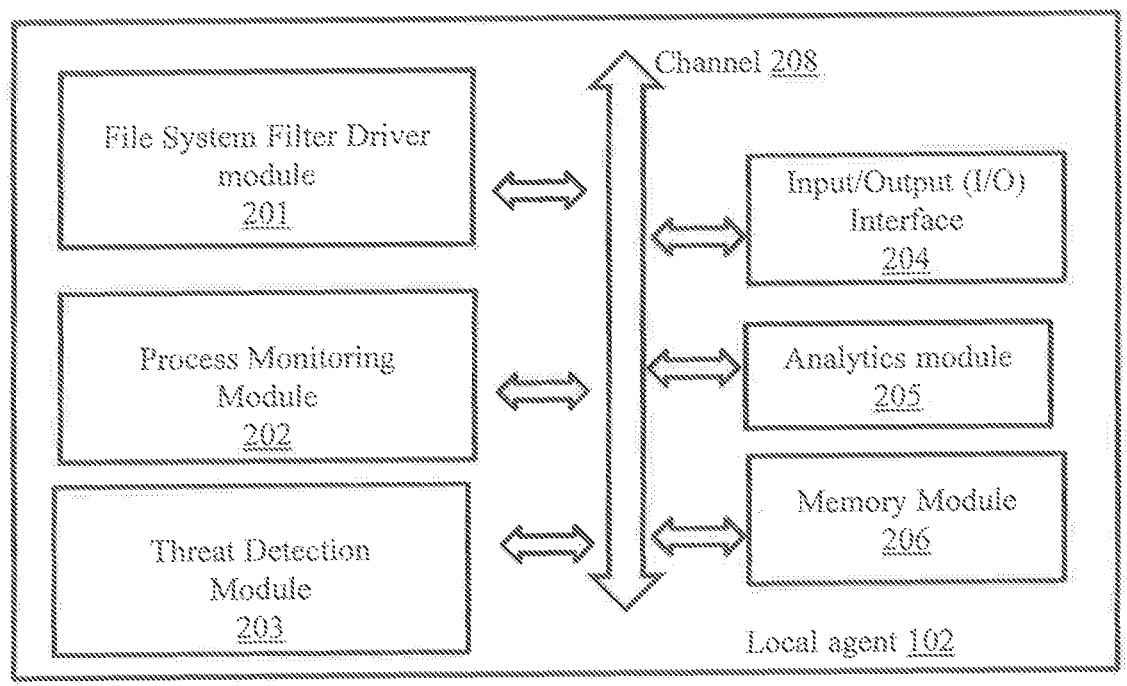
FIG. 2 is a functional block diagram depicting components of a local agent of the threat management system, according to some embodiments of the present disclosure.

FIG. 2 is a functional block diagram depicting components of a local agent of the threat management system, according to some embodiments of the present disclosure. The local agent 102 includes a file system filter driver module 201, a process monitoring module 202, a threat detection module 203, an Input/Output (I/O) interface module 204, an analytics module 205, and a memory module 206.

The file system filter driver module 201 can be configured to provide information pertaining to one or more I/O call, and access to a read/write buffer which allows the threat detection module 203 to perform virtualization of file system, on the fly (i.e. as and when a threat is detected or a process is exhibiting anomalous behavior or file system shows symptoms of possible attack). The process monitoring module 202 can be configured to monitor one or more process running in the UE, and notify all or selected events to the threat detection module 203. The threat detection module 203 can be configured to identify, based on information pertaining to I/O calls of each process being monitored, and data in the threat feature database part of the global database of the server 101, an attack or a possible threat, by performing a behavioral analysis. The threat detection module 203 can be configured to consider at least one pre-set criteria to identify the threat. For example, the criteria can be that the behavioral traits of the process being monitored matches at least 3 features of any trait defined in the threat feature database, then the threat detection module 203 identifies the file as under a possible attack from a ransomware threat.

The I/O interface 204 can be configured to provide the local agent 102 at least one suitable channel that supports at least one suitable protocol to initiate communication with the server 101 and/or at least one other network entity. The analytics module 205 can be configured to process data received from any other component of the local agent 102 using suitable data processing techniques/algorithms and provide the data back to the concerned component for further processing.

The memory module 206 can be configured to store different types of data associated with functions being managed by the threat management system 100, in one or more formats, and provide means for access of data by authorized components. For example, the memory module 206 stores the threat feature database, the database of patterns, and any such database that is used to store any information associated with the threat detection and mitigation performed by the threat management system 100, with appropriate update/refresh capabilities.

Figure 3:
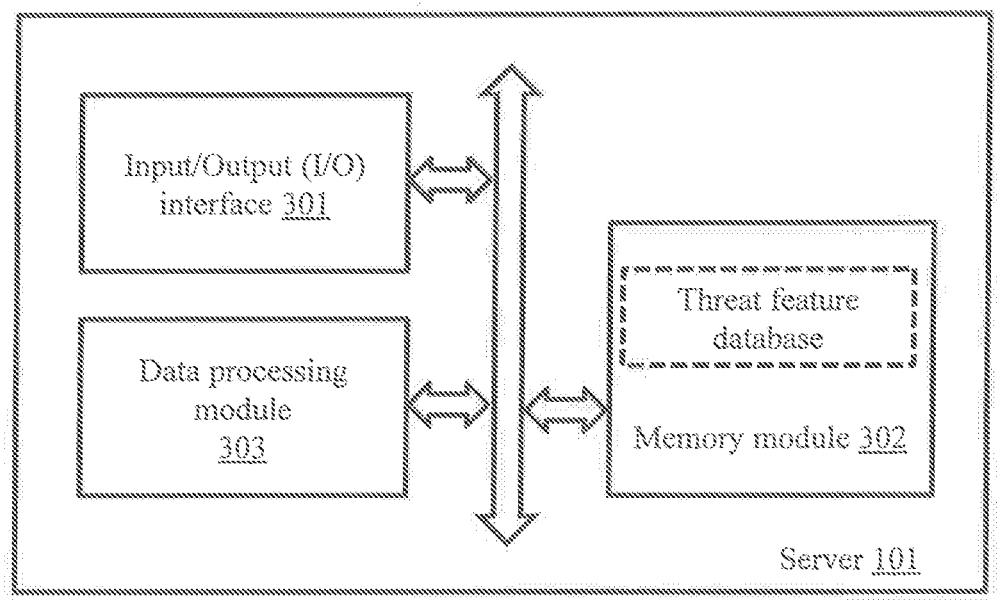
FIG. 3 illustrates a block diagram depicting components of a server of the threat management system, in accordance with some embodiments of the present disclosure.

FIG. 3 illustrates a block diagram depicting components of a server of the threat management system, in accordance with some embodiments of the present disclosure. The server 101 includes an I/O interface 301, a memory module 302, and a data processing module 303.

The I/O interface 301 can be configured to provide the server 101 at least one suitable channel that supports at least one suitable protocol to initiate communication with the local agent 102 and/or at least one other network entity. The memory module 302 can be configured to host the global database and any other database with information pertaining to the threat detection and mitigation handled by the threat management system 100, with appropriate update/refresh and access capabilities. The memory module 302 can be further configured to provide access for the local agent 102 and any other authorized entity, to the information stored in the associated databases.

The data processing module 303 can be configured to process information pertaining to one or more threat being detected by the local agent 102, and accordingly update the threat feature database. In an embodiment, the data processing module 303 processes the data collected from one or more associated local agents 102, and generates instructions to the local agent(s) 102 to perform necessary actions for threat detection and mitigation. In another embodiment, the data processing module 303 executes various actions associated with the threat detection and mitigation (for example, the behavioral analysis, the structural analysis, and the visualization of file system), as per implementation requirements.

Figure 4:
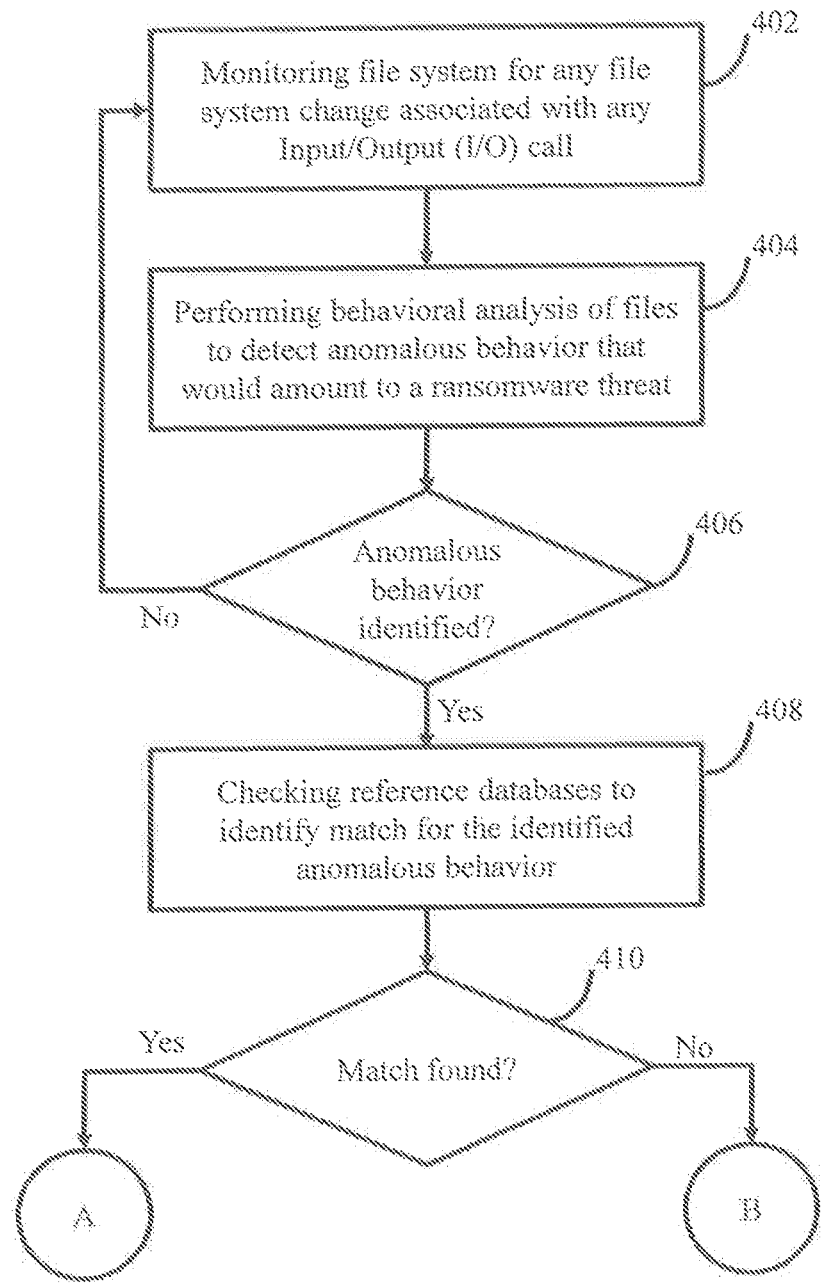
FIG. 4 is a flow diagram that depicts steps involved in the process of mitigating a ransomware threat using the threat management system according to some embodiments of the present disclosure.
Figure 4:
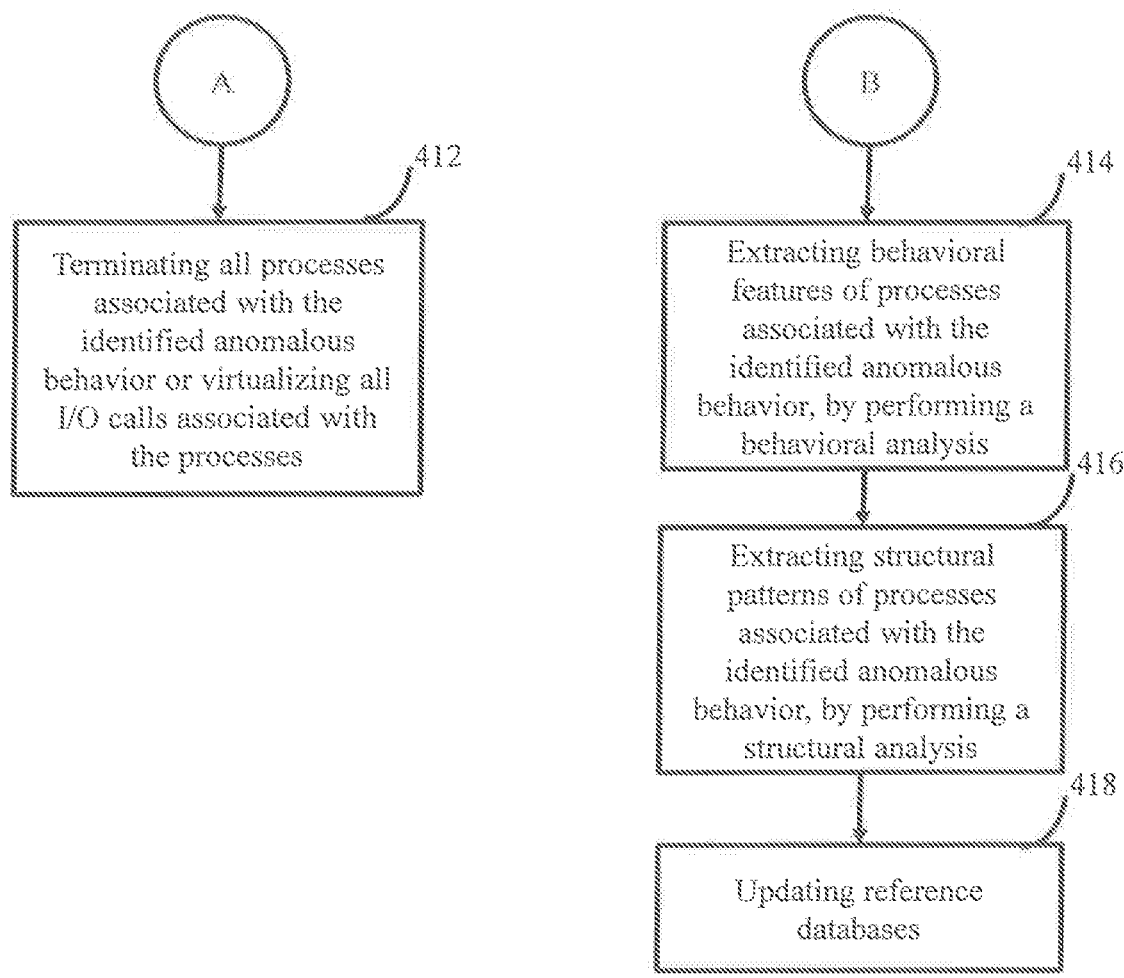

FIG. 4 is a flow diagram that depicts steps involved in the process of mitigating a ransomware threat using the threat management system according to some embodiments of the present disclosure. File system of a UE being monitored for ransomware threat detection is monitored (402) by the threat management system 100 for detecting any file system events. The file system events are caused by one or more I/O calls from an application or entity internal or external to the UE, and each I/O call targets one or more files in the file system, and upon gaining access to the one or more files, modifies the files (here the term 'modification' is used in a broad context, and is intended to register and report any operation performed on the files). Upon detecting a file system change, the threat management system 100 performs (404) a behavioral analysis of the file(s) to detect any possible anomalous behavior that would amount to a ransomware threat. If a possible threat is suspected, then the threat management system 100 visualizes (410) the file system to safeguard files from the processes operating on the files showing anomalous behavior. In an embodiment, if a file is not available for read in the visualized file system calls from the process that is identified as exhibiting the anomalous behavior, then the local agent 102 may allow read operation from the original file. However, write calls are always directed to the sparse file, as the sparse file can act as a quarantined zone that safeguards the original file, in case of a distributed network, the local agent 102 can be configured to use information pertaining to an identified attack to limit losses on one or more connected nodes. Post visualization, all I/O calls are routed to a sparse file created in in-memory region of the memory module 206, or a sparse file based file-system, network file-system or a folder on local file-system. For example, rerouting for a local folder may look like c:\temp\design.txt TO c:\temp\quarantine\design.txt, during the visualization of the file system. After the visualization of the file system, the threat management system checks (406) for any match for the identified anomalous behavior, in any of the associated reference databases, if a match is found, then the threat management system 100 either terminates all processes associated with the anomalous behavior or visualizes I/O calls for rest of the session (412). If no match is found, then the threat management system 100 extracts (414) behavioral features of processes associated with the identified anomalous behavior by performing a behavioral analysis, and further extracts (416) structural patterns of processes associated with the identified anomalous behavior by performing a structural analysis. Further the threat management system 100 updates (418) the associated databases. In an embodiment, the global database being maintained by the server 101 is updated first, followed by databases locally maintained by each local agent 102. Various actions in method 400 can be performed in the order specified, or in any other order as per requirements.

Figure 5:
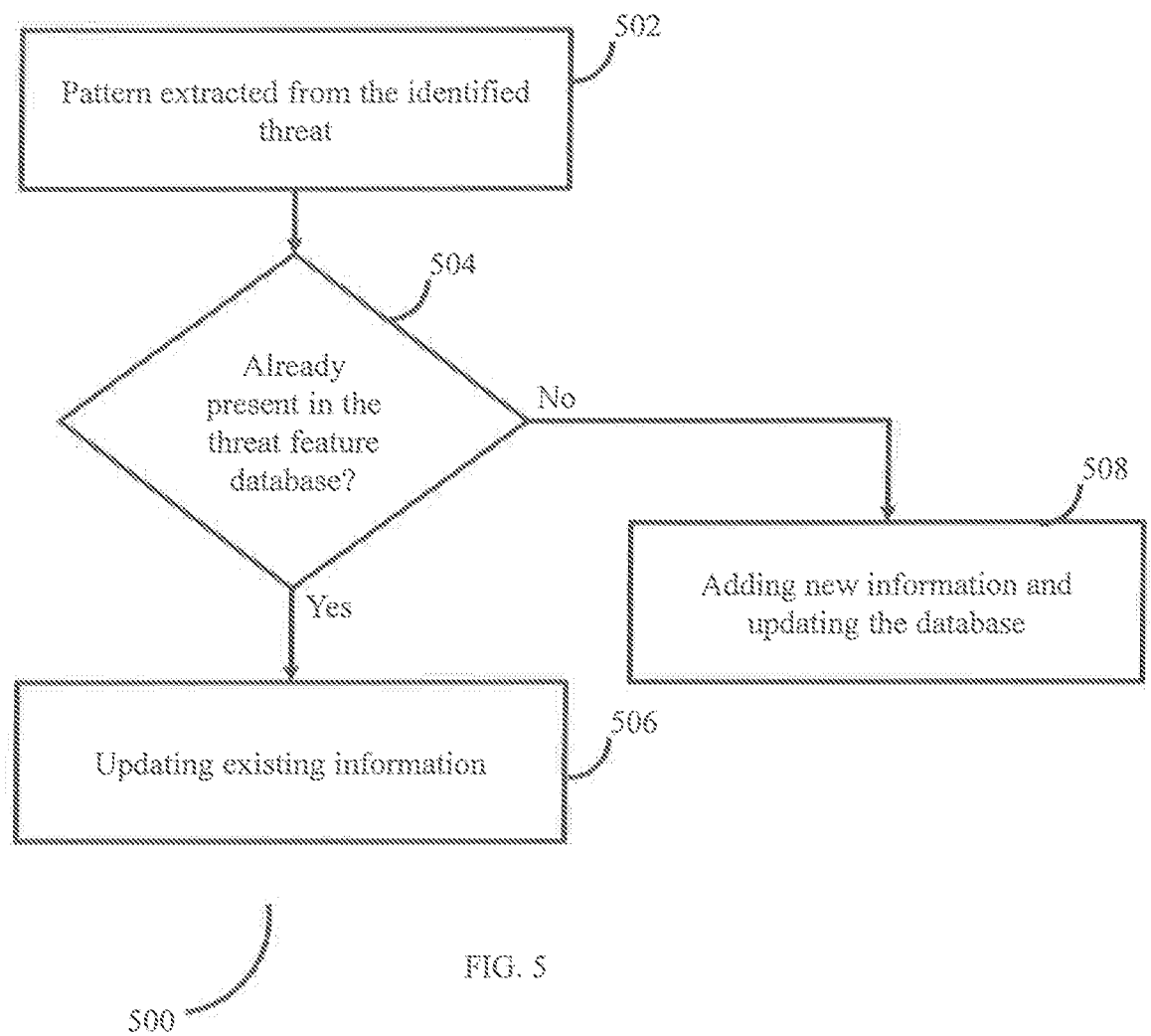
FIG. 5 is a flow diagram that depicts steps involved in the process of building one or more reference databases used for ransomware detection by the threat management system in accordance with some embodiments of the present disclosure.

FIG. 5 is a flow diagram that depicts steps involved in the process of building one or more reference databases used for ransomware detection by the threat management system in accordance with some embodiments of the present disclosure. Each time a threat is detected by the local agent 102, the server 101 collects (502) data pertaining to the detected threat. In an embodiment, the data collected refers to file access behavioral model (including features, feature combinations, values and so on, associated with one or more traits) information pertaining to the detected threat. If the same data is already present in the threat feature database (presence of same data is checked within the threat feature database at step 504), then the database is accordingly updated (506) with the number of occurrences of the detected threat, if the collected file access behavioral model information is identified as not present in the threat feature database, then the new information is added (508) to the database, which helps in building a dynamic model for future use, which is updated from time to time and kept in threat feature database. Various actions in method 500 can be performed in the order specified, or in any other order as per requirements. Furthermore, a distributed detection, identification and update cycle helps in reducing files losses on nodes which might get infected indirectly/directly from a connected infected node. This also helps in generating a cross validation model for reducing false positives.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method, comprising:
    monitoring file system filter driver hierarchy change on a User Equipment (UE) being monitored for ransomware attack, wherein file system events caused by execution of an Input/Output (I/O) call from an application or entity that is internal and external to the UE are detected, via one or more hardware processors, by a local agent of a threat management system;
    performing behavioral analysis of one or more files in the file system, associated with a detected file system event, to identify whether there is any anomalous behavior that would amount to a ransomware threat, via one or more hardware processors, by the threat management system, wherein the behavioral analysis is performed by extracting a plurality of features of the files and comparing the extracted features with a threat feature database in which features associated with behavioral traits are listed, and wherein the features in the threat feature database are categorized based on their corresponding behavioral traits as features directly related to files, features directly related to a process and features related to impact;
    performing on the fly virtualization of the file system if result of the behavioral analysis indicates presence of the anomalous behavior, wherein the file system is virtualized for all processes operating on the one or more files, during the virtualization, via the one or more hardware processors, by the threat management system, wherein post virtualization, all I/O write calls are directed to a sparse file created on a disk to safeguard original file, and if said sparse file is not available for I/O read calls from the process that is identified as a threat, the local agent allows read operation from the original file;
    checking one or more reference databases in the threat management system to find a match for the identified anomalous behavior, via the one or more hardware processors, by the threat management system;
    for at least one match found in the one or more reference databases:

performing at least one of termination of all the processes and virtualization of one or more I/O calls for the processes for rest of the session, via the one or more hardware processors, by the threat management system; and for no match found in the one or more reference databases:

performing behavioral analysis of one or more files in the file system, associated with each file system event, to extract at least one behavioral feature of the identified anomalous behavior that would amount to a ransomware threat, via one or more hardware processors, by the threat management system;

performing structural analysis on one or more of said processes associated with files showing anomalous behavior, if said one or more files are identified as under having the ransomware threat during the behavioral analysis, to extract patterns of the identified threat, via one or more hardware processors, by the threat management system; and sending information pertaining to the at least one behavioral feature and extracted pattern to a server associated with the threat management system, to update a global database maintained among the one or more reference databases, wherein the global database is updated in real-time from the local agent and comprises information pertaining to one or more of threats identified, corresponding features and feature combinations, corresponding value of each feature, counter actions taken and false positives.

2. The method as claimed in claim 1, wherein performing the behavioral analysis of one or more files comprises of:

identifying all processes associated with the one or more files showing the anomalous behavior;

extracting the plurality of features pertaining to each of the processes;

comparing said plurality of features of each of the processes, with the threat feature database, further wherein said threat feature database comprises of information pertaining to suspicious features that represent a possible threat, wherein the features in the threat feature database include one or more of but not limited to entropy density, path diversity, comparison of disk based binary image and loaded memory image, comparison of static and runtime call graph mutation, file attributes, process hierarchy, bytes read, bytes written, file handles, rate of creation, rate of modification and rate of mime change;

checking whether for any of the processes, at least a pre-specified number of matches are found in the threat feature database; and identifying all processes for which number of matches are at least matching the pre-specified number, as ransomware threats associated with the one or more files.

3. The method as claimed in claim 1, wherein performing the structural analysis of one or more files comprises of:

extracting pattern of each of the ransomware threats identified during the behavioral analysis;

comparing the extracted pattern with a reference database of patterns of ransomware threats among the one or more reference databases;

extracting information pertaining to the ransomware threat, based on data in the reference database of patterns, if at least one match for the extracted pattern is found in the reference database of patterns; and updating the reference database of patterns with information pertaining to the extracted pattern, if match for the extracted pattern is not found in the reference database of patterns.

4. The method as claimed in claim 3, wherein for an incorrect suspicion identified based on the comparison with the reference database of patterns, virtualization changes are reverted by the threat management system.

5. The method as claimed in claim 1, wherein performing virtualization of the file system comprises of:

virtualizing the file system upon detecting the anomalous behavior;

selecting virtualization mode as one of a local mode, or a quarantine mode, or an in-memory mode;

routing all I/O calls to a pre-defined folder, if the selected virtualization mode is the local mode, by the threat management system;

routing all the I/O calls to the sparse file of actual file each I/O call requested for, if the selected virtualization mode is the quarantine mode, wherein the sparse file is generated upon detecting the ransomware threat, by the threat management system; and routing all the I/O calls to an in-memory file system, if the selected virtualization mode is in-memory, wherein, the in-memory file system is discarded after completing analysis of the file.

6. A threat management system, comprising:

a processor; and a memory module comprising a plurality of instructions, said plurality of instructions configured to cause the processor to:

monitor file system filter driver hierarchy change on a User Equipment (UE) being monitored for ransomware attack, wherein file system events caused by execution of an Input/Output (I/O) call from an application or entity that is internal and external to the UE are detected, via one or more hardware processors, by a local agent of the threat management system;

perform behavioral analysis of one or more files in the file system, associated with a detected file system event, to identify whether there is any anomalous behavior that would amount to a ransomware threat, via one or more hardware processors, by the local agent, wherein the behavioral analysis is performed by extracting a plurality of features of the files and comparing the extracted features with a threat feature database in which features associated with behavioral traits are listed, and wherein the features in the threat feature database are categorized based on their corresponding behavioral traits as features directly related to files, features directly related to a process and features related to impact;

perform on the fly virtualization of the file system if result of the behavioral analysis indicates presence of the anomalous behavior, wherein the file system is virtualized for all processes operating on the one or more files, during the virtualization, via the one or more hardware processors, by the local agent, wherein post virtualization, all I/O write calls are directed to a sparse file created on a disk to safeguard original file, and if said sparse file is not available for I/O read calls from the process that is identified as a threat, the local agent allows read operation from the original file;

check one or more reference databases in the threat management system to find a match for the identified malicious behavior, via the one or more hardware processors, by the local agent;

for at least one match found in the one or more reference databases:
  perform at least one of termination of all the processes and virtualization of one or more I/O calls for the processes for rest of the session, via the one or more hardware processors, by the local agent; and for no match found in the one or more reference databases:
  perform behavioral analysis of one or more files in the file system, associated with each file system event, to extract at least one behavioral feature of the identified anomalous behavior that would amount to a ransomware threat, via one or more hardware processors, by the local agent;
  perform structural analysis on one or more of said processes associated with files showing anomalous behavior, if said one or more files are identified as under having the ransomware threat during the behavioral analysis, to extract pattern of the identified threat, via one or more hardware processors, by the local agent; and
  send information pertaining to the at least one behavioral feature and extracted pattern to a server associated with the threat management system, to update a global database maintained by the server, among the one or more reference databases, wherein the global database is updated in real-time from the local agent and comprises information pertaining to one or more of threats identified, corresponding features and feature combinations, corresponding value of each feature, counter actions taken and false positives.

7. The threat management system as claimed in claim 6, wherein the local agent is configured to perform the behavioral analysis by:
  identifying all processes associated with the one or more files showing the anomalous behavior;
  extracting the plurality of features pertaining to each of the processes;
  comparing said plurality of features of each of the processes, with the threat feature database, further wherein said threat feature database comprises of information pertaining to suspicious features that can be indicative of a possible threat, wherein the features in the threat feature database include one or more of but not limited to entropy density, path diversity, comparison of disk based binary image and loaded memory image, comparison of static and runtime call graph mutation, file attributes, process hierarchy, bytes read, bytes written, file handles, rate of creation, rate of modification and rate of mime change;
  checking whether for any of said plurality of processes, at least a pre-specified number of matches are found in the threat feature database; and
  identifying all processes for which number of matches are at least matching the pre-specified number, as ransomware threats.

8. The threat management system as claimed in claim 6, wherein the local agent is configured to perform the structural analysis by:
  extracting pattern of each of the ransomware threats identified by performing the behavioral analysis;
  comparing the extracted pattern with a reference database of patterns of ransomware threats among the one or more reference databases;
  extracting information pertaining to the ransomware threat, based on data in the reference database of patterns, if at least one match for the extracted pattern is found in the reference database of patterns; and
  updating the reference database of patterns with information pertaining to the extracted pattern, if match for the extracted pattern is not found in the reference database of patterns.

9. The threat management system as claimed in claim 8, wherein the local agent is configured to revert changes of virtualization for an incorrect suspicion identified based on the comparison with the reference database of patterns.

10. The threat management system as claimed in claim 6, wherein the local agent is configured to perform virtualization of the file system by:
  virtualizing the file system upon detecting the anomalous behavior;
  selecting recovery virtualization mode as one of a local mode, or a quarantine mode, or an in-memory mode;
  routing all I/O calls to a pre-defined folder, if the selected virtualization mode is the local mode, by the threat management system;
  routing all the I/O calls to ft the sparse file of actual data file each I/O call requested for, if the selected virtualization mode is the quarantine mode, wherein the sparse file is generated upon detecting the ransomware threat, by the threat management system; and
  routing all the I/O calls to an in-memory file system, if the selected virtualization mode is in-memory, wherein, the in-memory file system is discarded after completing analysis of the file.

\* \* \* \* \*